April 22, 1958

K. GEBELE 2,831,411

PHOTOGRAPHIC OBJECTIVE SHUTTER WITH PRE-TIMER

Filed Dec. 1, 1953

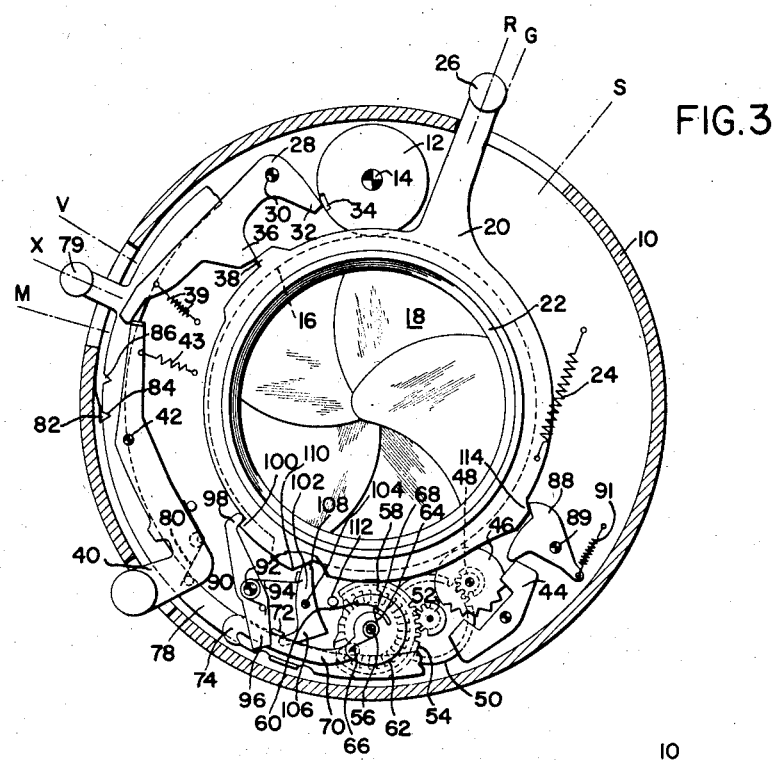

April 22, 1958     K. GEBELE     2,831,411
PHOTOGRAPHIC OBJECTIVE SHUTTER WITH PRE-TIMER
Filed Dec. 1, 1953     3 Sheets-Sheet 3

United States Patent Office 2,831,411
Patented Apr. 22, 1958

2,831,411

PHOTOGRAPHIC OBJECTIVE SHUTTER WITH PRE-TIMER

Kurt Gebele, Munich, Germany, assignor to Hans Deckel, Munich-Solln, and Friedrich Wilhelm Deckel, Garatshausen, Post Tutzing, Germany Application December 1, 1953, Serial No. 395,557

Claims priority, application Germany December 12, 1952

2 Claims. (Cl. 95—11.5)

This invention relates to a photographic shutter of the objective or between-the-lens type, and more particularly to an objective shutter of the set or tensioned type and having what is sometimes called a pre-timer or delayed action mechanism for delaying the opening of the shutter blades for a substantial interval after the trigger is tripped, to enable the photographer himself to get into the picture.

An object of the invention is the provision of a generally improved and more satisfactory shutter of this kind.

Another object is the provision of a shutter in which the pre-timer is set or tensioned by a manually operable member other than the one which sets or tensions the master member of the shutter, and in which the member for tensioning the pre-timer is combined with an externally accessible member performing another function also (such as setting the synchronizer for making flash exposures) in order to reduce to a minimum the external manipulating members of the shutter, thereby simplifying the operation.

A further object is the provision of an objective shutter of the set or tensioned type, equipped with a synchronizer for controlling the illumination of flash light pictures and equipped with a pre-timer to delay the making of the exposure, in which the setting or tensioning of the pre-timer is accomplished by manipulating the externally accessible member which adjusts the synchronizer.

These and other desirable objects may be attained in the manner disclosed as an illustrative embodiment of the invention in the following description and in the accompanying drawings forming a part hereof, in which:

Fig. 1 is a front view of a shutter in accordance with a preferred embodiment of the invention, with the front cover removed to show the parts beneath, with certain parts in section, and with various parts omitted for the sake of clarity, the parts being illustrated in normal rest position which they assume at the completion of one exposure and before the shutter is set or tensioned for the next exposure.

Fig. 3 is a similar view showing the parts shortly after the trigger is tripped for making an exposure, the parts having moved a slight distance from their set or tensioned position but the shutter blades being not yet opened.

Fig. 4 is a fragmentary view similar to the preceding views, illustrating a modified construction.

The same reference numerals throughout the several views indicate the same parts.

Figure 1:
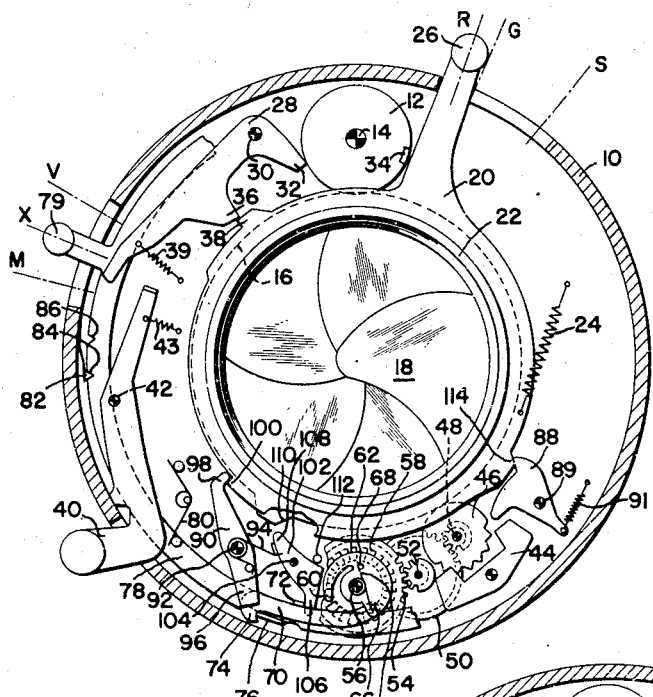

Except for the features herein specifically mentioned, the shutter may be of any conventional or known construction. It includes the usual annular shutter casing indicated in general at 10, having a central aperture defined by the inner wall of the shutter in the form of a lens tube 22, the aperture being normally closed by a series of shutter blades 18 of any convenient number, five blades being here shown. The main drive member or master member 12 is pivoted in the casing at 14, and is driven by the motor spring of conventional construction (not here shown) which tends to turn the master member in a clockwise direction. The master member is coupled through known coupling mechanism to the blade ring 16, in such manner that as the master member 12 turns clockwise or in an unwinding or running down direction from its fully tensioned position to its rest position, it drives the blade ring 16 first in a counter-clockwise direction, to open the blades 18, and then in a clockwise direction, to close the blades. The exact details of the operative connection whereby the master member 12 drives the blade ring 16 are unimportant for purposes of the present invention, but the driving connection may, if desired, be in the form disclosed in the U. S. patent to Singer, No. 2,785,612, granted March 19, 1957, on an application filed August 27, 1952, and owned by the assignees of the present application. The blades themselves are pivotally connected to the blade ring in known manner. The details of the pivotal connections are unimportant for present purposes, but may take the form disclosed in Deckel and Geiger Patent 1,687,123, wherein the shutter blades 12 are pivotally connected at 16 to the blade ring 14.

Any suitable escapement mechanism or timing mechanism of known form, not here shown, is operatively connected to the master member 12 or the blade ring 16, to control the length of time during which the blades 18 remain open, thus controlling the length of the exposure to a variable or adjustable extent.

The setting or tensioning of the master member is effected by a setting or cocking ring 20 mounted in the shutter casing for rotation about the optical axis or center of the shutter, conveniently being rotatable on the periphery of the lens tube 22. A light spring 24 connected at one end to the ring 20 and at the other end to a fixed pin in the casing, constantly tends to turn the setting ring 20 in a counter-clockwise direction to hold it in its rest position shown in Figs. 1 and 3, this position being indicated by the line R. A handle 26 formed on the ring 20 extends radially outwardly through a peripheral slot in the casing 10, to a manually accessible position exteriorly of the casing.

Figure 2:
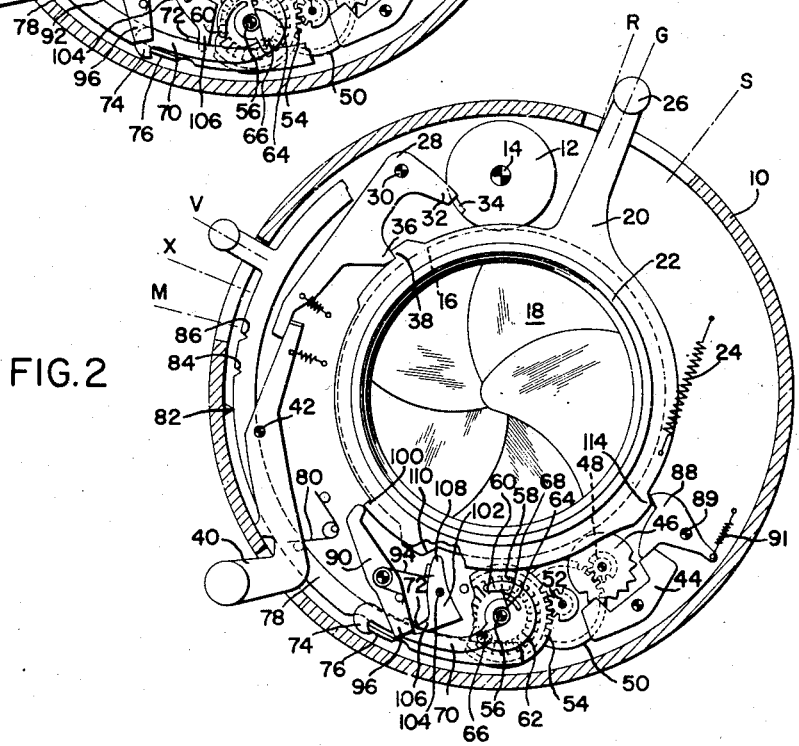
Fig. 2 is a similar view showing both the master member and the pre-timer in set or tensioned position.
Figure 7:
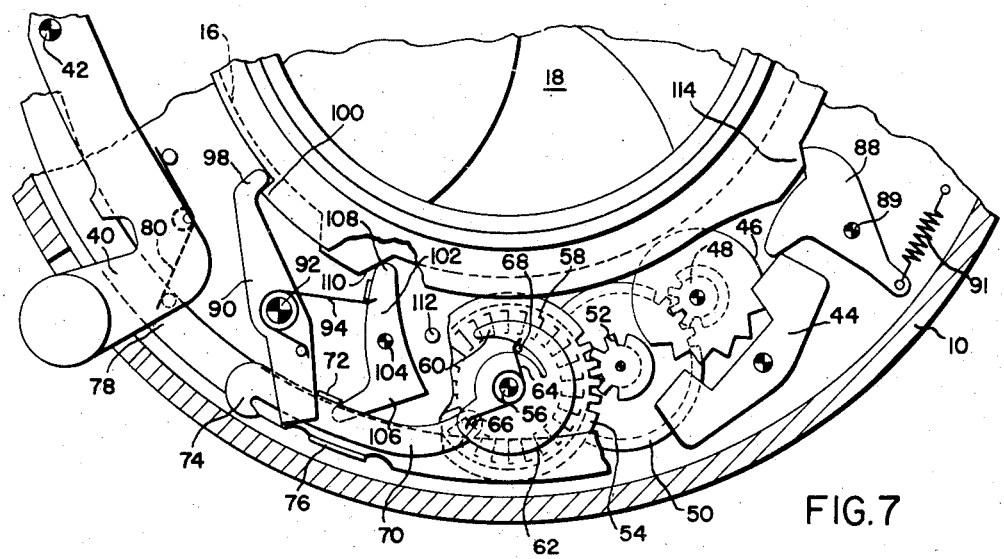
Fig. 7 is a view of the same parts shown in the lower portion of Fig. 3, in the same positions but on a larger scale, to illustrate the construction more clearly.
Figure 5:
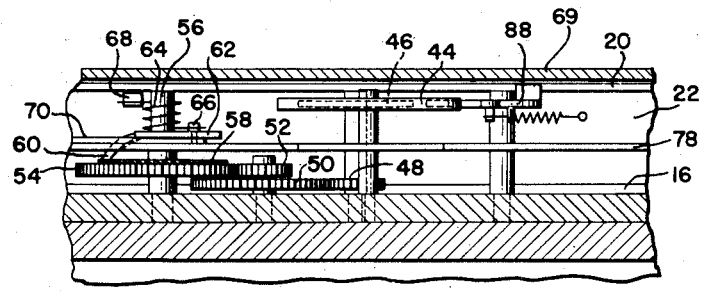
Fig. 5 is a section taken circumferentially through a fragment of the shutter, looking radially inwardly toward part of the pre-timer mechanism.
Figure 6:
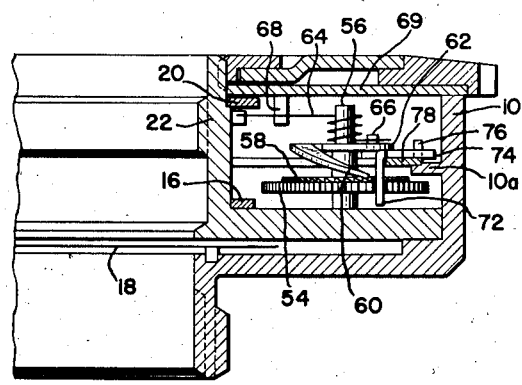
Fig. 6 is a section taken radially through the shutter just to the left of the parts shown in Fig. 5, illustrating some of the same parts seen in Fig. 5 from a different viewpoint.

When the handle 26 is moved clockwise from the position R to the position S, the movement of the ring 20 through suitable coupling mechanism of known form, serves to turn the master member 12 in a counter-clockwise direction from its rest position of Fig. 1 to its fully tensioned position of Fig. 2, thereby winding the main motor spring of the master member during such counter clockwise turning thereof. This tensioning of the master member may be accomplished in the manner disclosed in said Singer Patent 2,785,612. When the master member reaches this tensioned position, it is held in such position by a latch member 28 pivoted in the casing at 30 and having an end 32 which engages a lug 34 on the master member as seen in Fig. 2, and holds the master member against clockwise or running down movement until the latch is released. When the master member has been latched in tensioned position, the manual finger pressure on the handle 26 may be removed, and the spring 24 will then carry the setting ring 20 and handle 26 back from the S or set position to the G position, close to but not quite as far counter-clockwise as the R or rest position. The ring is prevented from going all the way back to rest position, by a portion 36 on the latch 28 which engages a shoulder 38 on the ring 20 to hold the ring in this G position as seen in Fig. 2. By reason of the fact that this position is different from the R or rest position, the photographer can, by glancing at the shutter, immediately ascertain that the shutter has been tensioned, and need not have any doubt as to whether a new tensioning manipulation is needed before the next exposure.

A light spring 39 tends to hold the latch 28 in the latching position shown in Fig. 2. It may be released or unlatched by means of a releasing member or trigger 40 pivoted at 42 within the casing and having one end extending out through a slot in the casing wall to an accessible external position as shown, a light spring 43 tending to turn the trigger in a clockwise direction on its pivot. If the end of the trigger or release lever is depressed to swing it counter-clockwise on its pivot, the tail of this lever will engage the tail of the latch lever 28 and swing the latch lever in a clockwise direction on its pivot 30, to the position shown in Fig. 3, thus releasing the master member 12 from restraint by the latching part 32 and simultaneously releasing the setting ring 20 from restraint by the latching part 36. The spring 24 may now return the setting ring 20 from position G to position R, and at the same time the main motor spring of the master member 12 may turn the master member in a clockwise direction to drive the blade ring 16 first to open and then to close the shutter blades, if the pre-timer is not being used in connection with this particular exposure. If the pre-timer is used, however, the shutter blades cannot open until the pre-timer has run through its course or cycle, as will now be described.

The pre-timer includes an escapment anchor or pallet 44 pivoted in the casing and cooperating with a star wheel or escapement wheel 46 fixed to a pinion 48 which meshes with a gear 50 fixed to a pinion 52 which in turn meshes with a gear 54 rotatably supported on the shaft 56 and formed as a ratchet wheel having upwardly projecting ratchet teeth 58 arranged to engage a downwardly bent tongue 60 on a tensioning disk 62 which is also rotatable on the shaft or axle 56, and which overlies the gear 54. A drive spring 64 is wound round the shaft 56 and has one end engaging a pin 66 on the tensioning disk 62 while the other end of the spring rests against a stationary pin 68 mounted on a stationary plate 69 at the front of the shutter, overlying the pre-timer parts but omitted from Figs. 1–4 of the drawings for the sake of clarity. The spring tends to turn the tensioning disk 62 in a counter-clockwise direction on its pivot 56.

On this same pin 66 of the tensioning disk 62, there is pivoted an elongated member 70 which may conveniently be called a pawl and which has a lug or ear 72 engaging in a guide slot in the shutter casing and which also has a hooked end 74 which engages under certain conditions with the lug 76 on the pre-timer setting member 78. It will be noted that the pre-timer setting member 78 is entirely separate and distinct from the main shutter setting or tensioning member 20. However, it is preferred to combine the pre-timer setting member 78 with some other externally accessible operating member of the shutter, so as to reduce as far as reasonably possible the number of different external operating members on the shutter. To this end, in the preferred form of the invention, the pre-timer setting member 78 is formed as part of the synchronizer adjusting member which may otherwise be of known form and which has an externally accessible handle 79 projecting outwardly through a slot in the shutter casing so that the handle is shiftable to the position indicated at X or to position M, as desired, depending upon whether one desires to take a flashlight picture with what is known in the art as X synchronization or with M synchronization. As is well understood by those familiar with synchronized photographic shutters, there is an electric switch built into the shutter, and when the synchronizer is set for X synchronization, for use with instantaneous or no-lag flash units, the electric switch is closed substantially at the same instant that the shutter blades reach their fully open position. On the other hand, when it is desired to take a flashlight picture by a conventional flash bulb of the "M" type, in which the flash bulb reaches a peak of illuminating intensity about twenty milliseconds after the electric circuit is closed, the handle 79 is placed in the M position and this adjusts the synchronizer mechanism so that the built-in electric switch is closed about twenty milliseconds before the shutter blades reach their fully open position. The construction of the synchronizer itself, including the manner in which the switch mechanism is adjusted by moving the member 78 and the handle 79 from M position to X position or vice versa, is of known form and the specific details thereof are not important so far as the present invention is concerned, so are not here illustrated. It is sufficient for present purposes to understand that the member 78, 79 does control the setting or adjustment of the synchronizer, and that it is resiliently held in one or another of its adjusted positions by the leaf spring 82 fixed to the casing 10, which engages in the notch 84 of the member 78 when set in X position, and in the notch 86 of the member 78 when set in M position.

But according to the present invention, this synchronizer setting or adjusting member 78 may also be moved clockwise from the X position to a third position indicated at V. When it is moved from X position (Fig. 1) to V position (Fig. 2), the lug 76 on the member 78 engages the hook 74 on the pawl 70 and pulls this pawl 70 along with it, thereby turning the tensioning disk 62 and winding the spring 64, to the necessary tension for operating the pre-timer.

During this tensioning of the pre-timer, the gears thereof are locked by means of a locking pawl 88 pivoted in the shutter casing at 89 and urged in a counter-clockwise direction by a spring 91 so that an arm on the pawl engages one end of the escapement pallet or anchor 44 and holds the other end thereof in one of the notches of the star wheel 46, thereby locking all of the gears of the pre-timer against turning. Therefore, when the tensioning disk 62 is turned in a clockwise direction by a clockwise movement of the pre-timer setting member 78, the tongue 60 clicks in a clockwise direction over the teeth 58 of the gear 54 since the gear is locked against turning movement at this time. And when the clockwise pressure on the member 78 and pawl 70 is released, the force of the spring 64 will attempt to turn the disk 62 in a counter-clockwise direction, but cannot do so because the tongue 60 will engage the next adjacent one of the teeth 58 on the gear 54, thereby holding the disk 62 in tensioned position because the gear 54 cannot turn at this time. The synchronizer adjusting member 78, when released, may turn back in a counter-clockwise direction under the influence of its spring 80 which constantly tends with slight force to shift it in that direction, until the spring 82 engages in the notch 84 to stop the synchronizer adjusting member in the X position thereof, or it may be manually shifted further to M position if it is desired to take a picture using M synchronization.

When the shutter is tensioned and the main tensioning ring is in the G position which it assumes upon completion of tensioning, the locking lever 88 locks the pre-timer gear train, as above mentioned. But when the tensioning ring 20 moves from G position to rest or R position, a shoulder 114 on the tensioning ring engages the locking lever 88 and shifts it from the locking position shown in Fig. 2 to the released position shown in Fig. 3, so that the gears of the pre-timer are free to rotate. Therefore, it is seen that the pre-timer should be tensioned only when the master member has been tensioned and the setting or tensioning ring is in G position. To prevent inadvertent tensioning of the pre-timer before the master member has been tensioned, there is provided a safety mechanism in the form of a double arm locking lever or pawl 90 rotatable on a fixed pivot 92 in the shutter casing and influenced by a spring 94 which tends to turn the locking lever in a clockwise direction so that the tail 96 thereof will lie in the path of the lug 76 on the pre-timer tensioning member 78, and prevent this member from being turned clockwise beyond its X position toward its V position, although not interfering with shifting this member back and forth between X position and M position. The other end or nose 98 of the locking lever 90 lies against the periphery of the main setting or tensioning ring 20, in such position that a shoulder 100 on this ring 20 engages the nose 98 and shifts the lever 90 in a counter-clockwise direction when the setting ring 20 is moved clockwise from its R position. Thus, as long as the setting member 20 remains in its rest or R position as in Fig. 1, the latching lever 90 prevents the pre-timer from being set or tensioned. But when the setting member 20 is moved clockwise from its rest position R, to position S to set or tension the master member 12, and then returns backward to its G position, as in Fig. 2, the nose 98 of the lever 90 is displaced and the tail 96 thereof is shifted out of the way of the lug 87 on the pre-timer setting member and synchronizer adjusting member 78, thereby permitting the member 78 to be moved from X position to V position to tension the pre-timer, which can be done effectively at this time because the locking lever 88 is locking the gears of the pre-timer against rotation.

The operative connection between the pre-timer and the master member 12 is effected through the blade ring 16 and through a double arm intermediate lever 102 which is pivoted at 104 in the shutter casing and which is engaged by one end of the same spring 94 which operates on the lever 90, in such manner as to tend to swing the lever 102 in a clockwise direction. One arm 106 of this lever 102 lies in the path of the lug 72 of the pawl 70, to be moved thereby during the running down of the pre-timer. The other arm 108 of the lever 102 lies in the path of a shoulder or abutment 110 on the blade ring 16 so as to prevent the blade ring 16 from moving in a counter-clockwise direction to open the shutter blades, until the end 108 is removed from the path of the abutment 110. This locking position is shown in Fig. 3. A stationary stop pin 112 in the shutter casing determines the extreme or rest position of the lever 102 when the pre-timer is completely run-down.

It is believed that the operation of the shutter will be clear from the detailed description which has been given above. However, it may be convenient to give a brief résumé of the operation at this point.

Assuming that the shutter is in the rest or run-down position shown in Fig. 1, the first step in making the shutter ready for the next exposure is to grasp the externally accessible handle 26 of the shutter setting or tensioning ring 20 and move it in a clockwise direction from position R all the way to position S, to tension or cock the master member 12 by winding it in a counter-clockwise direction. The handle 26, when it reaches the position S, is released, and the spring 24 returns the member 20, 26 almost but not quite back to the rest or R position, the members 20, 26 being held in the G position and the master member 12 being held in fully tensioned position by means of the latch 28 engaging the parts 34 and 38 as seen in Fig. 2.

If an exposure is to be made without pre-timing operation and without flashlight, nothing more remains to be done (so far as operation of the shutter is concerned) except to press the shutter trigger or release member 40 (assuming, of course, that the diaphragm aperture has been set to the desired amount and that the shutter speed has been adjusted in the desired way). This depression of the trigger 40 turns the latch 28 to release simultaneously both the master member 12 and the setting ring 20, so that the spring 24 returns the setting ring to its rest or R position, and the master member 12 turns clockwise under the influence of the main motor spring, oscillating the blade ring 16 first in a counter-clockwise direction and then in a clockwise direction, respectively to open and close the shutter blades 18.

If an exposure is to be made with flashlight but without pre-timing, the setting or tensioning member 26 is moved to S position and back to G position, just as before. The synchronizer adjusting member 78 is then set (if not already set) by moving the handle 79 to either X position, when use of X synchronization is desired, or to M position, when use of M synchronization is desired, as the case may be. Then the shutter trigger 40 may be depressed as before, to make the exposure.

When, however, a pre-timed exposure is to be made, so that there is an opportunity for the photographer himself to get into the picture, the shutter is tensioned or cocked by means of the members 20, 26 just as previously described. But the next step, regardless of whether or not synchronization is to be used, is to set or tension the pre-timer, by moving the pre-timer tensioning member 78 which is independent of the main setting member 20 and which, for sake of simplicity, is combined with another externally accessible functioning part of the shutter, preferably with the synchronizer setting member. The movement of the main tensioning member 20, 26 to S position and back to G position had affected the locking lever 88 so as to engage the pallet or anchor 44 and thereby lock the train of gears of the pre-timing mechanism. Also, the movement of the member 20, 26 to G position has caused the shoulder 100 to move a lever 90 out of the way of the lug 76. Therefore, it is now possible for the operator to move the handle 79 of the synchronizer adjusting member clockwise beyond the X position to the V position, so that the lug 76 pulls on the hook 74 of the pawl 70, tensioning the spring 64 of the pre-timer. At the same time, the tensioning movement of the pawl 70 displaces the lug 72 so that the spring 94 may swing the locking lever 102 to bring the end 108 thereof in the path of the abutment or shoulder 110 on the blade ring 16, preventing the blade ring from moving far enough to open the shutter blades. This is the position of the parts shown in Fig. 2. The synchronizer setting member 79 may then be moved back from the V position to the X position (or may be allowed to move back by itself, under the influence of its spring 80) if no synchronization is desired or if X synchronization is desired; or if it is desired to take a picture with M synchronzation, the member 79 may be moved back further from the X position to the M position.

The exposure is now made by depressing the shutter release member or trigger 40, which turns the latch 28 to release simultaneously both the master member 12 and the tensioning ring 20. The master member then starts to turn the blade ring 16, but after a very slight movement of the blade ring, and before the shutter blades begin to open, the shoulder 110 on the blade ring comes into contact with the end 108 of the lever 102, preventing further movement of the blade ring, so that the master member stops its movement. However, the release of the latch 28 from the setting ring 20 has allowed the spring 24 to turn the setting ring back from its G position to its R position (as seen in Fig. 3) whereby the shoulder 114 turns the locking lever 88 of the pre-timer mechanism to release the anchor or pallet 44 so that the gears of the pre-timer mechanism may begin to turn under the power of the spring 64. After a suitable interval depending upon the design of the pre-timer (usually an interval of about ten seconds or more) the rotation of the pre-timer gears proceeds far enough so that the pin 66 on the disk 62 draws the member 70 to the right (when viewed as in Fig. 3) a sufficient distance so the lug 72 thereon engages the part 106 of the lever 102 and turns this lever counter-clockwise on its pivot 104, to withdraw the end 108 from the abutment 110 of the blade ring 16. Thus the blade ring is no longer blocked, and the master member 12 may continue on to complete its movement, driving the blade ring to open and close the shutter blades 18 to make the exposure. At the end of the exposure, the parts are back in the rest position indicated in Fig. 1.

In Fig. 4 there is shown a modified construction which has the advantage of having an externally visible part remain in a different position, when the pre-timer has been tensioned, from the position in which it stays if the pre-timer has not been tensioned. In this way, by observing such externally visible part, the operator can tell, when ready to make the exposure, whether or not the pre-timer is tensioned. According to this modification, the pre-timer setting member 78 is provided with a flange or ear 116 having serrations or knurling or fine teeth engaged by one end 120 of a locking lever 122 pivoted in the casing at 124 beneath the locking pawl 28 and constantly urged in a counter-clockwise direction by a spring 126. The opposite end 128 of this lever 122 lies in the path of a cam 130 on the blade ring 16, which cam comes into contact with the end 128 and releases the end 120 from the teeth 116, in the short initial movement of the blade ring as above described.

With this alternative construction, when the member 78, 79 is moved clockwise from X position to V position in order to tension the pre-timer, it is not allowed to come back immediately to the X position, but is held in the V position by engagement of the locking pawl 120, 122 with the teeth 118 on the member 78. Thus the position of the protruding handle 79 forms a visual signal to the operator, showing that the pre-timer is in set or tensioned condition. Upon release of the shutter for making an exposure, the short initial movement of the blade ring 16, before the shoulder 110 thereof comes into contact with and is stopped by the lever 102, serves to bring the cam 130 against the end 128 of the locking lever 122 and turns the locking lever to release the teeth 116, so that the spring 80 may immediately return the synchronizer adjusting member to its X position, ready for effecting X synchronization when the shutter blades open, if a flashlight picture with X synchronization is desired at this time. The remainder of the exposure operation is the same as previously described.

It has been mentioned above that the member 78, 79 may set or control the synchronizer mechanism in any known manner. Merely as one example of a synchronizer mechanism set by a member of this general form, reference is made to the construction disclosed in my United States patent application filed July 9, 1952, Serial No. 297,901. The synchronizer adjusting member 78, 79 in the present application may correspond in general to the adjusting member 228, 230 in my said prior application. Also the tensioning ring 20 of the present application may be coupled to the master member 12 to set or tension the same, in approximately the same way, for example, that the setting or tensioning ring 24 in my said prior application is coupled to the master member 12 in said prior application, or in the manner disclosed in said Singer Patent 2,785,612, the exact details of this part of the structure being unimportant for purposes of the present invention, as already mentioned above.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographing shutter comprising a blade ring, a master member for moving said blade ring, a main tensioning member movable from a rest position to a second position to tension said master member and movable reversely from said second position to an intermediate third position after tensioning the master member, a spring tending to return said main tensioning member from said third position to said rest position, a latch for latching said master member in tensioned position and said tensioning member in said third position, pre-timer means movable between tensioned and rest positions, blocking means controlled by said pre-timer means and effective, when said pre-timer means is tensioned, to block said blade ring against blade-opening movement, said pre-timer means being effective upon running down from tensioned position to rest position to move said blocking means so that said blade ring may perform a blade-opening movement, a pre-timer latch for holding said pre-timer means against running-down movement, and means controlled by movement of said main tensioning member from its intermediate third position to its rest position for releasing said pre-timer latch so that said pre-timer may run down and move said blocking means to permit said blade ring to open the shutter blades.

2. A construction as defined in claim 1 further including a synchronizer control member movable to different positions to condition the shutter for different types of flashlight synchronization and movable also to another position independent of flashlight synchronization, and means operatively connected to said control member for tensioning said pre-timer means upon movement of said control member to said other position.

References Cited in the file of this patent

UNITED STATES PATENTS

| 2,081,727 | Barenyi | May 25, 1937 |
| 2,090,070 | Riddell | Aug. 17, 1937 |
| 2,245,248 | Aulenbacher et al. | June 10, 1941 |
| 2,405,741 | Fuerst | Aug. 13, 1946 |
| 2,588,980 | Hodges | Mar. 11, 1952 |
| 2,663,233 | Rentschler | Dec. 22, 1953 |